United States Patent [19]

Hurd

[11] 3,953,076
[45] Apr. 27, 1976

[54] BOTTLE CONVEYOR
[75] Inventor: Stanley E. Hurd, Sunnyvale, Calif.
[73] Assignee: The Motch & Merryweather Machinery Company, Hayward, Calif.
[22] Filed: July 23, 1974
[21] Appl. No.: 491,025

[52] U.S. Cl. ................................. 302/2 R; 302/31
[51] Int. Cl.² ........................................ B65G 51/02
[58] Field of Search ...................... 302/2 R, 29, 31; 198/204; 214/1 BE

[56]  References Cited
UNITED STATES PATENTS

| 3,105,720 | 10/1963 | Barker | 302/2 R |
|---|---|---|---|
| 3,180,688 | 4/1965 | Futer | 302/29 |
| 3,181,916 | 5/1965 | Epstein | 302/29 |
| 3,210,124 | 10/1965 | Niemi et al. | 302/2 R |
| 3,350,140 | 10/1967 | Strydom | 302/31 |
| 3,647,266 | 3/1972 | Hurd et al. | 302/31 |
| 3,684,327 | 8/1972 | Hurd | 302/29 |
| 3,788,457 | 1/1974 | Valentino | 198/204 |
| 3,844,405 | 10/1974 | Shuford | 198/204 |

Primary Examiner—Evon C. Blunk
Assistant Examiner—Jeffrey V. Nase
Attorney, Agent, or Firm—Patrick J. Walsh

[57]  ABSTRACT

An air conveyor is disclosed including a conveyor path defined by a perforated deck plate which issues air jets for moving articles along the conveyor. A guide system constrains the article for movement along the path under the influence of the air jets. The guide member further cooperates with the conveyed article to conserve propelling air.

10 Claims, 5 Drawing Figures

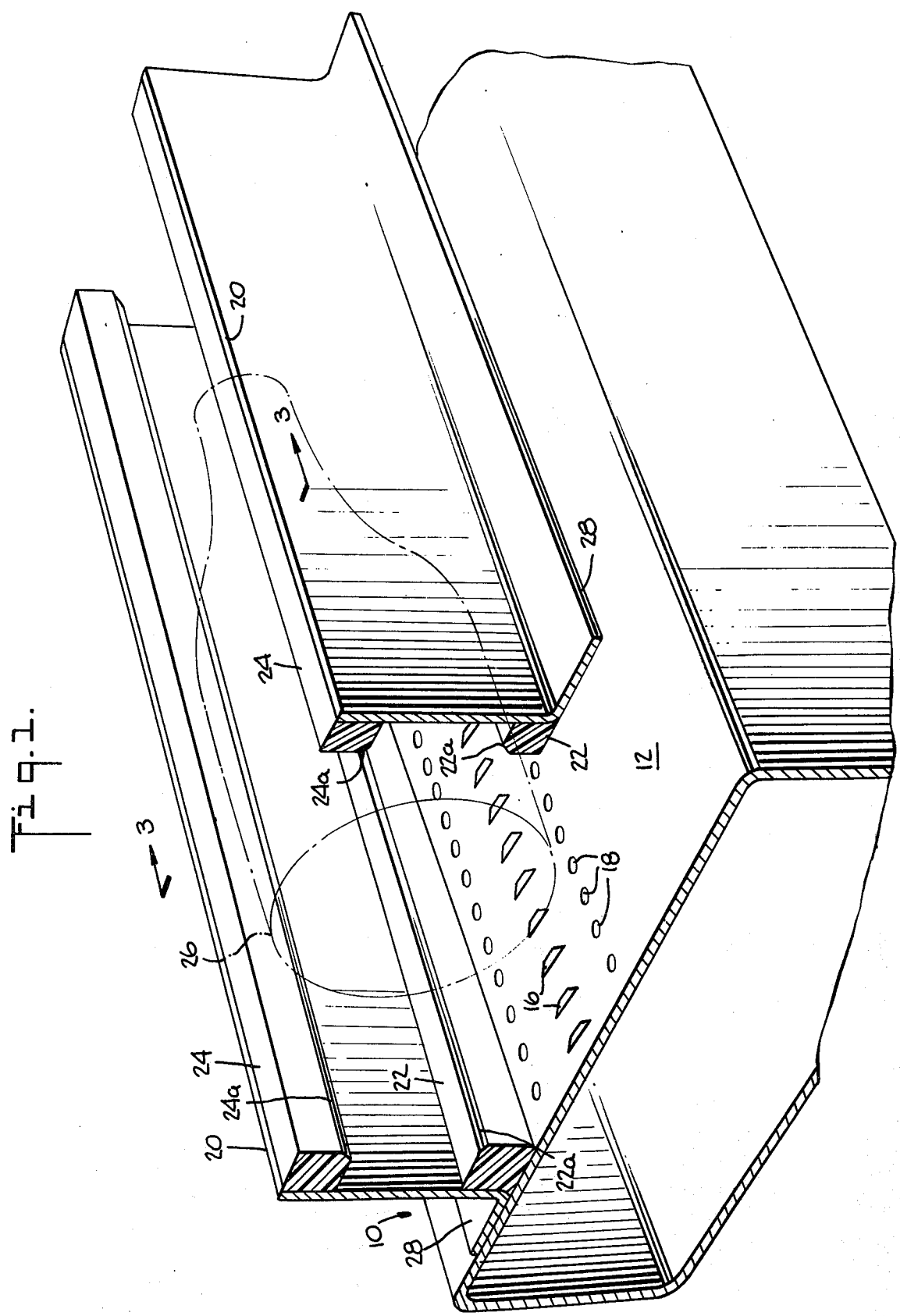

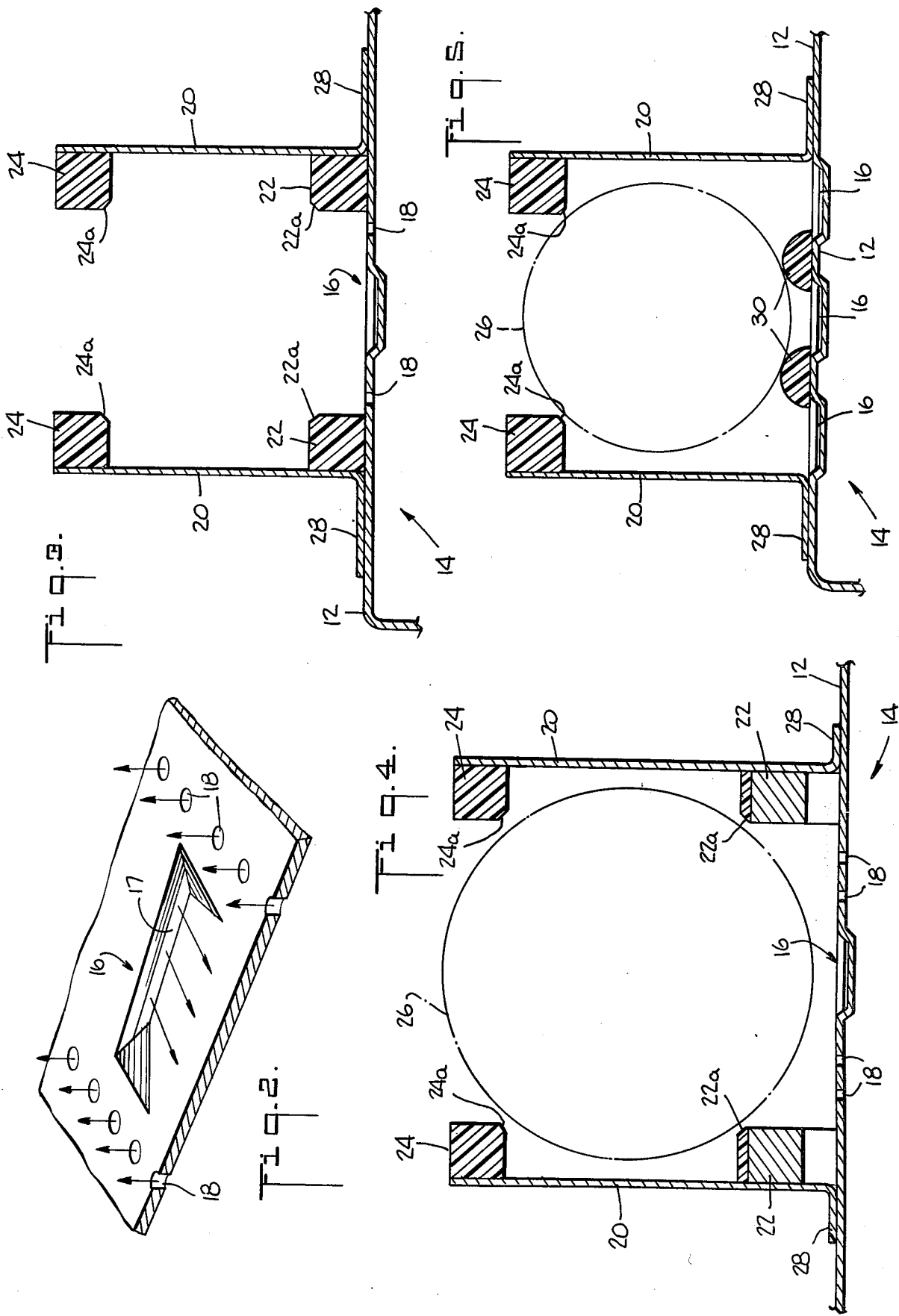

BOTTLE CONVEYOR

BACKGROUND OF THE INVENTION

Plastic bottles are currently used for a variety of purposes, and to a large extent such bottles are considered highly useful for use as soft beverage containers. Conventional glass bottle handling equipment is unsuited for handling plastic bottles because of the tendency of such equipment to scuff or scratch the relatively softer surface of plastic bottles handled in a bottling operation.

SUMMARY OF THE INVENTION

The present invention provides an air conveyor for conveying plastic bottles at high rates of speed without marring or scratching. In a preferred embodiment the invention comprises an air conveyor including a deck plate having perforations for issuing propelling and lifting air jets for conveying bottles along the conveyor. A plenum chamber underlying the deck supplies air under pressure through the perforations to form air jets. A pair of confronting, imperforate upstanding guide members extend along the conveyor on either side of the perforations for guiding the bottles as they move along the conveyor. Each guide member includes a pair of guide surfaces which contact, guide, and protect plastic bottles as they move along the conveyor. The imperforate side guide members act to increase the propulsion effect of the conveying air by restricting the escape of the air to the sides and constricting it to act efficiently upon the bottles. Moreover, rubbing on the bottom of the bottles is minimized and friction and scuffing of each bottle is reduced.

Accordingly, an object of the present invention is to provide an air conveyor for articles such as plastic bottles.

Another object of the invention is to provide an air conveyor which is efficient for conveying articles such as plastic bottles with a minimum power requirement.

A further object of the present invention is to provide a conveyor for moving articles such as plastic bottles at high rates of speed without marring or scratching them.

Other and further objects will become apparent upon an understanding of the specification, drawings, and claims or will occur to one skilled in the art upon employment of the invention in practice.

A preferred embodiment has been chosen for illustrating the present invention in which:

FIG. 1 is a perspective view of a preferred embodiment of the invention;

FIG. 2 is a fragmentary perspective view of a conveyor deck plate illustrating perforations including lift holes and propulsion slots formed in the deck surface;

FIG. 3 is a section view taken along line 3—3 of FIG. 1;

FIG. 4 is a section view in front elevation illustrating a modified embodiment of the present invention, and;

FIG. 5 is a section view in front elevation illustrating a further modified embodiment of the invention.

Referring now to the drawing FIG. 1, the present invention is directed to an air conveyor 10 including a perforated deck plate 12 and a plenum chamber 14. Pressurized air is supplied to the plenum by suitable means such as a fan or blower (not shown). Air under pressure in the plenum chamber flows through the perforated deck plate to lift and move articles along the conveyor. The deck plate includes propulsion slots 16 and lift holes 18 which issue air jets to propel and lift articles with respect to the conveyor. As shown by the arrows in FIG. 2, pressurized air flows through each propulsion slot 16 in the form of an air jet having a predominantly horizontal flow component for propelling articles along the conveyor. Each propulsion slot is formed by an incision in the deck plate creating a slot or opening 17 through which the pressurized air jet flows. Preferably, the deck plate includes lift holes 18 arranged in one or more rows extending longitudinally of the deck plate and disposed on either side of the row of propulsion slots. The lift holes are vertically oriented openings in the deck plate, and in consequence issue vertically directed air jets (shown by arrows in FIG. 2) which exert a lifting force on articles moved by the conveyor. The combination of propulsion slots and lift holes may be varied according to the product conveyed so to provide a desired balance of lift and propulsion forces. Typically, an air conveyor may include a single row of propulsion slots extending longitudinally and arranged centrally of the deck plate flanked with two rows of lift holes as shown in FIG. 1. Alternately, the conveyor may include two (or more) rows of lift holes arranged to extend longitudinally on either side of the deck plate propulsion slots as shown in FIG. 4.

According to the present invention, a pair of upstanding side walls 20 extends along the conveyor with each side wall having a pair of spaced guide surfaces 22, 24 for engaging and guiding articles such as bottles 26 being moved by the conveyor. Each side wall includes suitable means such as an integral outwardly extending flange 28 for attachment to the deck plate 12. Preferably, the guiding surfaces are fabricated from material which is compatible with plastic bottles. That is to say, the guide surfaces preferably do not scratch or mar the surface of the plastic bottle. As shown in the drawing, each guide surface is chamfered 22a, 24a to avoid marring the articles conveyed. It will be observed that the lower guide surfaces 22 extend downwardly to the deck surface 12 to trap the conveying air behind the conveyed articles. In this respect it will be appreciated that the side guides cooperate with the conveying and lifting air jets which issue through the deck plate to give the optimum conveyance of plastic bottles by the conveyor.

In a typical application of the present invention, 1 quart soft drink bottles fabricated of plastic and weighing approximately 65 grams each are conveyed (bottom end leading), at rates up to 240 per minute at an air pressure in the plenum chamber of 2.4 inches water gauge.

In another application of the invention, 10 ounce soft drink bottles were conveyed at rates around three hundred per minute at approximately 2 inch water gauge air pressure in the plenum. In this application the guide members trap and conserve air to provide optimum conveying conditions. Under these conditions the bottles being conveyed will accumulate at rest and recover to the stated conveying rates without increase of air pressure.

Each of the guide surfaces is fabricated from a highly abrasion resistant (i.e. wear resistant), low friction, easily machinable material which avoids scuffing or marking the bottles being conveyed. A high density polyethylene material available under the trademark "GAR-DUR" provides an excellent guide surface.

A modified form of the invention is illustrated in FIG. 4 in which the lower guide members 22 are elongated vertically in order to accommodate a 32 ounce plastic bottle. Guide members 22 extend down to the surface of the deck plate in order to trap and conserve conveying air.

A further modification of the invention is shown in FIG. 5 in which the deck plate 12 has three longitudinally extending rows of propulsion slots 16. A pair of half round guide members 30 are located on the deck surface between adjacent rows of propulsion slots. The upper guide surfaces 24 are generally rectangular as described above.

It is important to understand that each of the side walls is imperforate to aid in conserving the propelling and lift air jets.

It will be understood that the present invention provides a unique air conveyor in which the article being conveyed cooperates with the conveyor to conserve the conveying medium so to give maximum conveying rates with minimum expenditure of energy. Moreover, the conveying/guide surfaces are such that minimal marring occurs to the articles (plastic bottles) being conveyed.

What is claimed is:

1. An air conveyor for articles such as containers and the like having a generally symetrical continuous exterior wall surface with a predetermined dimension between laterally opposed wall portions of said articles comprising:
    a deck plate with a plurality of openings therein for issuing air jets to move articles along the conveyor, means for supplying pressurized air through the deck plate openings, said openings extending in a row along the conveyor surface, a pair of imperforate upstanding wall members extending longitudinally of the conveyor in confronting relation to each other and being located on opposite sides of the row of openings, said side wall members being spaced apart a distance greater than the predetermined lateral dimension of said articles, each of said side wall members having first guide surfaces being disposed along the upper inner marginal edge thereof to define cooperating guide surfaces spaced apart a distance less than the predetermined lateral dimension of said articles thereby to guide said articles by engaging spaced longitudinally extending portions of each article wall surface, whereby said articles cooperate with the first guide surfaces to trap and conserve conveying air between the articles and the deck surface, and a second pair of spaced guide members extending longitudinally of the conveying surface for supporting the articles above the deck plate surface, said second guide surfaces being generally parallel to each other and being spaced apart a distance less than the predetermined lateral dimension of said articles.

2. An air conveyor as defined in claim 1 in which the deck plate includes at least three longitudinally extending, laterally spaced rows of openings, and in which the second guide surfaces are located between adjacent rows of openings.

3. An air conveyor as defined in claim 1 in which each of said first and second guide surfaces comprises vertically spaced members affixed to said sidewalls.

4. An air conveyor as defined in claim 1 in which said openings are propulsion slots disposed in a row along said conveyor and which further includes a plurality of rows of lift holes disposed longitudinally of the deck plate in spaced relation to said openings.

5. An air conveyor as defined in claim 1 in which said guide surfaces are fabricated from a highly abrasion resistant material.

6. An air conveyor as defined in claim 1 in which said guide surfaces are fabricated from a low friction material.

7. An air conveyor as defined in claim 1 in which said guide surfaces are fabricated from high density polyethylene.

8. An air conveyor as defined in claim 1 in which said guide surfaces are fabricated from a substantially rectangular member affixed in vertically spaced pairs to said side walls.

9. An air conveyor as defined in claim 8 in which each of said members is chamfered to define a guide surface.

10. An air conveyor as defined in claim 1 in which each of said side walls comprises an imperforate L-shaped plate affixed along the surface of the deck plate.

* * * * *